United States Patent [19]

Suzuki

[11] E Patent Number: Re. 33,116

[45] Reissued Date of Patent: Nov. 21, 1989

[54] SINGLE-STAGE OILLESS SCREW COMPRESSOR SYSTEM

[75] Inventor: Akira Suzuki, Atsugi, Japan

[73] Assignee: Hitachi, Ltd., Tokyo, Japan

[21] Appl. No.: 905,957

[22] Filed: Sep. 11, 1986

Related U.S. Patent Documents

Reissue of:

[64] Patent No.: 5,293,636
Issued: Jul. 16, 1985
Appl. No.: 563,037
Filed: Dec. 19, 1983

[30] Foreign Application Priority Data

Sep. 12, 1983 [JP] Japan ..... 58-166644

[51] Int. Cl.[4] ..... F04B 49/00; F01C 1/08

[52] U.S. Cl. ..... 417/295; 417/362; 418/83; 418/201

[58] Field of Search ..... 417/295, 362, 310; 418/83, 201

[56] References Cited

U.S. PATENT DOCUMENTS 3,367,652 2/1968 Persson et al. ..... 417/295

3,975,123 8/1976 Schibbye ..... 418/201

*Primary Examiner*—Leonard E. Smith

*Attorney, Agent, or Firm*—Antonelli, Terry & Wands

[57] ABSTRACT

A single-stage oilless screw compressor system includes a single-stage oilless screw compressor of the type which is capable of operation without requiring oil to be fed to a working chamber of the compressor and which has a pressure ratio (discharge pressure/suction pressure) of over 4, preferably in the range between 7 and 8. The system further includes a precooler located in a gas passage on the discharge side of the compressor, a check valve located on the outlet side of the precooler and a cooler located on the outlet side of the check valve, for supplying a clean gas having no oil incorporated therein which has a pressure of above 4 kgf/cm$^2$. The check valve for avoiding the backflow of compressed gas to the compressor is protected from a large amount of heat by the precooler mounted in the gas passage on the discharge side of the compressor, to enable the valve to operate stably and have a prolonged service life while causing the temperature of the compressed gas of high temperature released from the compressor to effectively drop to a level suitable for the use of the compressed gas.

19 Claims, 3 Drawing Sheets

SINGLE-STAGE OILLESS SCREW COMPRESSOR SYSTEM

Matter enclosed in heavy brackets [ ] appears in the original patent but forms no part of this reissue specification; matter printed in italics indicates the additions made by reissue.

BACKGROUND OF THE INVENTION

This invention relates to a single-stage oilless screw compressor system which is suitable for use as a source of air supply in fields in which a clean gas (air) is required, such as a food industry, a testing and measuring instrument manufacturing industry, a painting and a press for semiconductor manufacturing apparatus.

An oilless screw compressor system is known as a system for producing a clean air or clean gas having no oil incorporated therein. In this known system, for example, disclosed in U.S. Pat. No. 3,367,562, a gas has its pressure raised by two-stage compression, that is, the gas is compressed by means of a low pressure stage compressor to about 3 kgf/cm$^2$ (gauge pressure) and is cooled by an intermediate cooler and then the gas is compressed again by means of a high pressure stage compressor to a predetermined level between 7 and 8 kgf/cm$^2$ (gauge pressure) and is cooled again by an aftercooler.

The system of the prior art for supplying a clean gas is of a two-stage compression type not of a single-stage compression. Even if a single-stage oilless screw compressor is combined with the two-stage compressor system, it would be impossible to eliminate obnoxious effects of high temperature because the temperature of the discharged gas of the single-stage compression oilless screw compressor would exceed 300° C. In a known system, no means has been provided for eliminating defects which would be experienced due to the discharged has having a high temperature.

SUMMARY OF THE INVENTION

An object of this invention is to provide a single-stage oilless screw compressor system capable of supplying, by a single-stage compression, a clean gas of a pressure of over 4 kgf/cm$^2$ (gauge pressure) which has no oil incorporated therein and has a pressure ratio (discharge pressure/suction pressure) of over four.

Another object is to provide a single-stage oilless screw compressor system capable of protecting a valve means for avoiding a backflow of compressed gas to the compressor from high temperature, to thereby stabilize the operation of the valve means and prolong a service life thereof.

Still another object is to provide a single-stage oilless screw compressor system capable of causing the temperature of the compressed gas of high temperature discharged from the compressor to drop to a temperature level suitable for the use of the compressed gas, with excellent effects.

To accomplish the aforesaid objects, the invention provides the outstanding characteristic that the system comprises a single-stage oilless screw compressor, a precooler mounted in a gas passage on the discharge side of the compressor, a check valve mounted on the outlet side of the precooler and a cooler mounted on the outlet side of the check valve.

In this specification the term "single-stage oilless screw compressor" refers to a type of compressor which performs compression in a single stage with a pressure ratio (discharge pressure/suction pressure) of over four or preferably in the range between seven and eight and which performs operation without requiring oil fed to the operation chamber of the compressor.

DESCRIPTION OF THE PREFERRED EMBODIMENT

Figure 1:
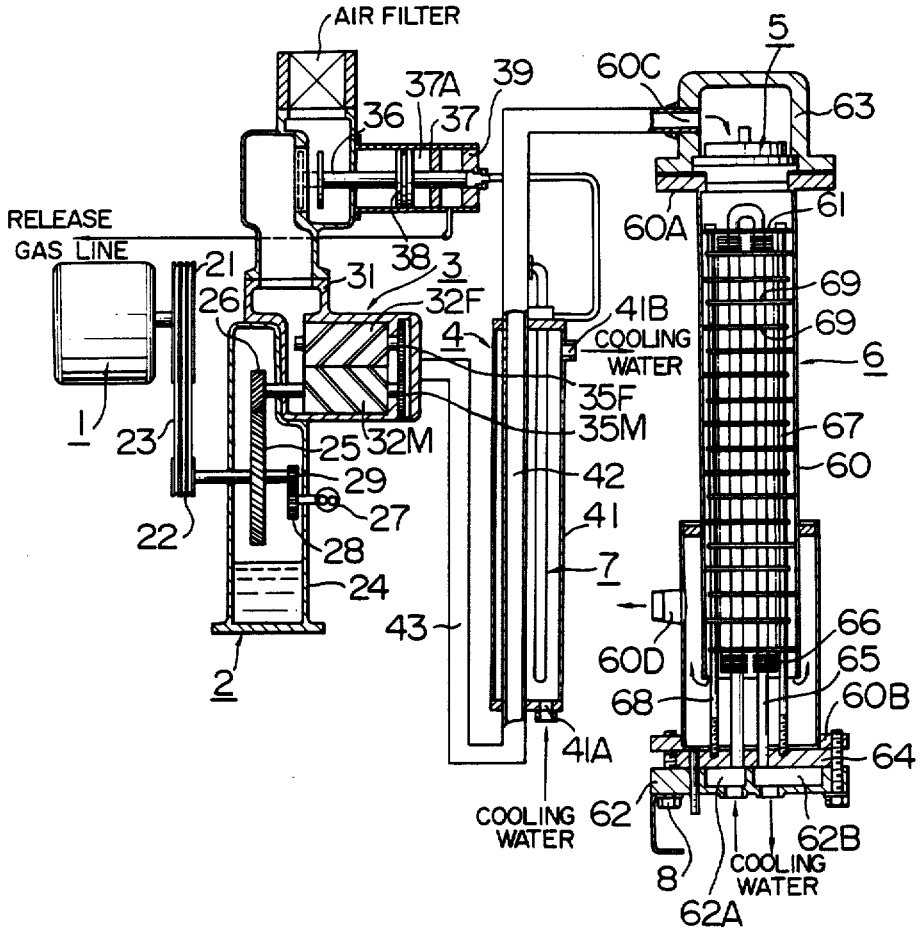
FIG. 1 is a systematic view of the single stage oilless screw compressor system of one embodiment of the invention.

As shown in FIG. 1, a single-stage oilless screw compressor system according to the invention comprises a drive unit generally designated by the reference numeral 1, such as a motor or an engine, transmission unit generally designated by the reference numeral 2, a single-stage oilless screw compressor generally designated by the reference numeral 3, a precooler generally designated by the reference numeral 4, a check valve generally designated by the reference numeral 5, a cooler generally designated by the reference numeral 6 and release cooler generally designated by the reference numeral 7.

The transmission unit 2 comprises a drive pulley 21, a follower pulley 22, V-belts 23, a gear box 24, a gear 25 and a pinion 26. The drive pulley 21 is secured to an output shaft of the drive unit 1, and the follower pulley 23 is secured to a shaft of the gear 25 meshing with the pinion 26 which is secured to a rotor shaft of the single-stage oilless screw compressor 3. The V-belt 23 is trained over the two pulleys 21 and 22. The drive pulley 21 has a diameter which is about twice as large as that of the follower pulley 22, so as to increase the rotational speed by about twofold. The number of teeth of the gear 25 is about five to six times as great as that of the pinion 26, so as to further increase the rotational speed by about fivefold or sixfold. Thus, as the rotation is transmitted from the pulley 21 to the pinion 26, the rotational speed of the drive unit 1 is increased to ten to twelve times as high as its original value at the pinion 26.

An oil-feeding pump 27 is coupled to the shaft of the gear 25 through gears 28 and 29, with the oil-feeding pump 27 functioning to draw a lubricant collecting in a bottom portion of the gear box 24 and feed the same to meshing surfaces of the gears 25 and 26 and the bearing of the compressor 3 et al.

Figure 3:
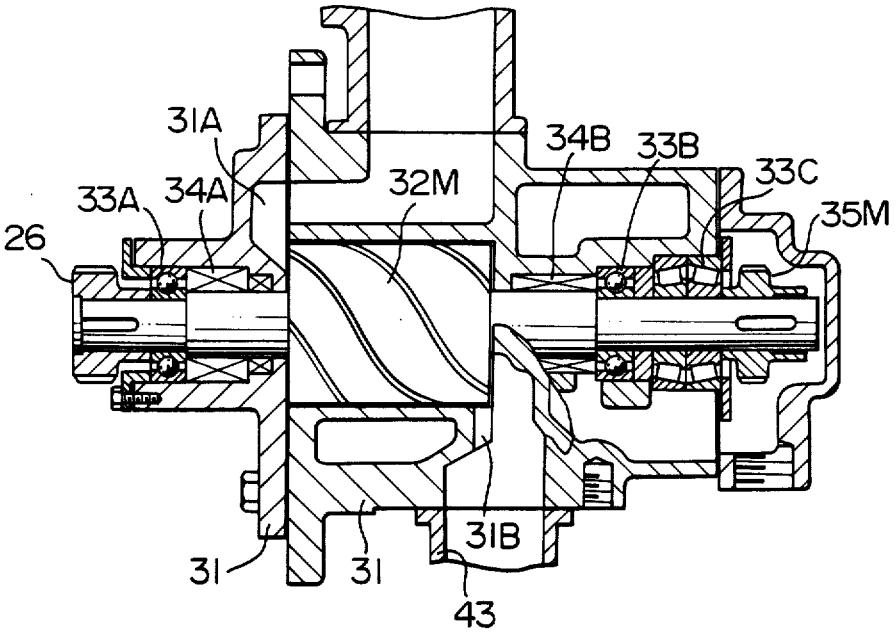
FIG. 3 is a sectional view of the compressor, showing its construction in detail.

As shown in FIG. 3, the compressor 3 comprises a casing 31 formed with a suction port 31A and a discharge port 31B, a pair of screw rotors 32M and 32F rotatably supported in the casing 31, bearings 33A, 33B and 33C, supporting the pair of screw rotors 32M and 32F, suction side seal means 34A and discharge side seal means 34B interposed between the casing 31 and shafts of the screw rotors 32M and, respectively, synchronizing gears 35M and 35F causing the pair of screw rotors 32M and 32F to rotate synchronously, a suction port adjusting valve 36 mounted adjacent the suction port 31A of the casing 31, a cylinder 37 and a piston 38 for actuating the suction port adjusting valve 36, and an air release valve 39. The compressor 3 has a pressure ratio (discharge pressure/suction pressure) of seven and is capable of compressing air drawn by suction into the pair of screw rotors 32M and 32F to raise its pressure sevenfold.

As further shown in FIG. 1, the precooler 4 is connected to the discharge port 31B of the compressor 3 through a line 43 and comprises a shell 41 formed with an inlet 41A and an outlet 41B for cooling water, and a heat transfer tube 42 located inside the shell 41. While only one heat transfer tube 42 is illustrated in the drawings, it is possible to, for example, provide two heat transfer tubes. The heat transfer tube 42 is formed of steel (carbon steel) so as to be able to withstand a high temperature in the range between 300° and 350° C., or above. The check valve 5 is mounted on the outlet side of the precooler 4.

The cooler 6 comprises a shell 60 formed at opposite ends with flanges 60A and 60B, a tube nest 61 located inside the shell 60, a water chamber case 62 and a cover 63. The tube nest 61 comprises a tube 65 formed of copper which is in the form of an inverted letter U and connected at ends thereof to a tube plate 64, fins 66 fitted over the tube 65, and a plurality of baffle plates 69 supported in staggered relation by through bolts 68 connected at ends to the tube plate 64 in such a manner that the baffle plates 69 are spaced from one another at a predetermined distance by spacers 67. The cover 63 is connected to the flange 60A of the shell 60 at its top, and the check valve 5 is located inside the cover 63. The tube plate 64 is held between the flange 60B and the water chamber case 62, and the tube plate 64, flange 60B and water chamber case 62 are connected by bolts 8 into a unitary structure. The tube plate 64 cooperates with the water chamber case 62 to define an inlet water chamber 62A and an outlet water chamber 62B. An inlet port 60C and an outlet port 60D for a compressed gas are respectively formed in the cover 63 and a large diameter portion of the shell 60.

Figure 2:
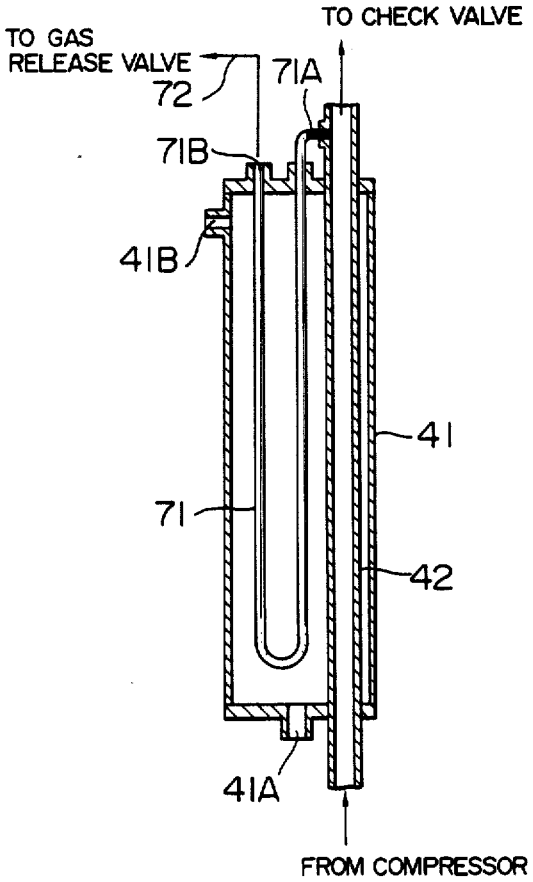
FIG. 2 is a sectional view of the precooler, showing its construction in detail.

As shown most clearly in FIG. 2, air release cooler 7 comprises a shell and a heat transfer tube 71, with the air release cooler 7 being accommodated in the shell 41 with the precooler 4. The heat transfer tube 71 is located in the shell 41 and has an inlet 71A connected to the outlet side of the heat transfer tube 42 of the precooler 4 and an outlet 71B connected to the gas release valve 39 through a line 72.

Operation of the embodiment of the invention will now be described.

Actuation of the drive unit 1 provides a drive force which is transmitted to the compressor 3 through the transmission unit 2 which increases the rotational speed, to drive the pair of screw rotors 32M and 32F of the compressor 3 for rotation at high speed (about 50–100 m/sec in peripheral speed). As a result, air under a pressure of 1 kgf/cm$^2$ is drawn by suction from the atmosphere through the suction port 31A into a working chamber defined by the pair of screw rotors 32M and 32F where the air is compressed into compressed air which is discharged through the discharge port 31B. At this time the compressed air is under pressure of 7 kgf/cm$^2$ and has a temperature in the range between 300° and 350° C. The compressed air of high temperature is cooled as it exchanges heat with cooling water in the shell 41 while flowing through the heat transfer tube 42 of the precooler 4, until its temperature reaches the range between 250° and 100° C. at the outlet section of the heat transfer tube 42. The compressed air thus precooled flows through the check valve 5 into the shell 60 of the cooler 6 where it flows downwardly in serpentine flow as it is guided by the baffle plates 69, to be forwarded through the outlet 60D to a station where it is put to use. Heat exchange takes place between the compressed air flowing downwardly in and through the shell 60 in serpentine flow with the cooling water flowing in and through the tube 65, so that the compressed air has a temperature of about 45° C. at the outlet 60D.

Meanwhile, as the volume of the air in use decreases, the pressure rises on the discharge side of the compressor 3 to a level above a predetermined level. The rise in pressure is sensed by a manometer, not shown which generates a signal to feed air to a chamber 37A of the cylinder 37 for actuating the piston 38 to move the suction port adjusting valve 36 from a solid line position to a phantom line position, to thereby throttle the volume of air fed inti the compressor 3. The air release valve 39 is opened by the movement of the piston 38, and the compressed air compressed by the compressor 3 is cooled by the precooler 4 and then it is cooled by the cooling water in the shell 41. Some air flowing through the heat transfer tube 71 of the air release cooler 7 is released through the opened air release valve 39 into the atmosphere or the suction side of the compressor 3.

The invention has been shown and described as being incorporated in the compressor having a suction pressure of 1 kgf/cm$^2$ and a discharge pressure of 7 kgf/cm$^2$. However, this is not restrictive and the invention has application in a system having a discharge pressure of over 4 kgf/cm$^2$.

What is claimed is:

1. A single-stage oilless screw compressor system comprising:

a drive unit;

transmission means connected to said drive unit for increasing a rotational speed thereof;

a single-stage oilless screw compressor connected to said transmission means and having a pressure discharge pressure to suction ratio of over four, said single-stage oilless screw compressor comprising a casing formed with a suction port and a discharge port, a pair of screw rotors, rotatably located in said casing and meshing with each other, bearing means supporting said pair of screw rotors, seal means interposed between said casing and shafts of said pair of screw rotors, and synchronizing gear means mounted on said pair of screw rotors for bringing about synchronization of their rotations;

a precooler connected to a discharge side of said single-stage oilless screw compressor, said precooler comprising a heat transfer tube allowing compressed gas to flow therein and therethrough and a shell enclosing said heat transfer tube for allowing a cooling medium to flow therein and therethrough;

a cooler connected to an outlet side of said precooler, said cooler comprising a shell for the compressed gas to flow therein and therethrough, and a heat transfer tube located inside said shell and allowing the cooling medium to flow therein and therethrough; and a check valve located in a compressed gas passage between said precooler and said cooler.

2. A single-stage oilless screw compressor system as claimed in claim 1, further comprising suction port adjusting means located on a suction side of said compressor for adjusting the volume of gas drawn by suction into the compressor, said suction port adjusting means comprising a suction port adjusting valve for throttling the volume of gas drawn by suction into the compressor, and a piston and a cylinder for actuating said suction port adjusting valve.

3. A single-stage oilless screw compressor system as claimed in claim 2, further comprising a gas release valve brought to an open position when the volume of gas introduced into the compressor is throttled and a gas release cooler further cooling the compressed gas fed from said precooler when the gas is released, said gas release cooler comprising a heat transfer tube connected at an inlet to an outlet of said heat transfer tube of the precooler, and the shell of said precooler enclosing said heat transfer tube of said precooler and said gas release cooler, said shell of said precooler having a cooling medium flowing therein and therethrough, and said gas release valve being located at an outlet end of said heat transfer tube of said gas release cooler.

4. A single-stage oilless screw compressor system as claimed in claim 3, wherein said heat transfer tube of said precooler is formed of steel.

5. A single-stage oilless screw compressor system as claimed in claim 3, wherein said gas release valve is connected to said piston of said suction port adjusting means.

6. A single-stage oilless screw compressor system as claimed in claim 4, wherein said cooler comprises the shell of said cooler formed with an inlet port, an outlet port and flanges and allows the compressed gas to flow therein and therethrough, a tube nest comprising a heat transfer tube secured to a tube plate and allowing the cooling medium to flow therein and therethrough, fins fitted to an outer peripheral surface of said heat transfer tube, a plurality of baffle plates arranged in staggered relation to cause a stream of compressed gas to flow in serpentine flow, spacers for keeping said baffle plates at a predetermined spacing interval, through bolts supporting said baffle plates to said tube plate, and a water chamber case secured to one of the flanges of said shell of said cooler through said tube plate, said water chamber case being formed with an inlet port and an outlet port for the cooling medium.

7. A single-stage oilless screw compressor system as claimed in claim 1, wherein said transmission means comprises a drive pulley secured to an output shaft of said drive unit, a gear box, a gear supported in said gear box, a follower pulley connected to said gear, belts trained over said drive pulley and said follower pulley, and a pinion secured to one of said screw rotors of said compressor and meshing with said gear.

8. A single-stage oilless screw compressor system as claimed in claim 7, wherein the acceleration ratio between the pulley and the follower pulley is about two times and the acceleration ratio between the gear and the pinion is five to six times.

*9. A single-stage oilless screw compressor system comprising:*

*a drive unit;*

*transmission means connected to said drive unit for increasing a rotational speed thereof;*

*a single-stage oilless screw compressor connected to said transmission means and having a pressure discharge pressure to suction ratio of over four, said single-stage oilless screw compressor comprising a casing formed with a suction port and a discharge port, a pair of screw rotors rotatably located in said casing and meshing with each other, bearing means supporting said pair of screw rotors, seal means interposed between said casing and shafts of said pair of screw rotors, and synchronizing gear means mounted on said pair of screw rotors for bringing about synchronization of their rotations;*

*a precooler connected to a discharge side of said single-stage oilless screw compressor, said precooler comprising a heat transfer tube and a shell enclosing said heat transfer tube;*

*a cooler connected to an outlet side of said precooler, said cooler comprising a heat transfer tube and a shell enclosing said heat transfer tube; and*

*a check valve located in a compressed gas passage between said precooler and cooler.*

*10. A single-stage oilless screw compressor system as claimed in claim 9, further comprising suction port adjusting means located on a suction side of said compressor for adjusting the volume of gas drawn by suction into the compressor, said suction port adjusting means comprising a suction port adjusting valve for throttling the volume of gas drawn by suction into the compressor, and a piston and a cylinder for actuating said suction port adjusting valve.*

*11. A single-stage oilless screw compressor system as claimed in claim 10, further comprising a gas release valve brought to an open position when the volume of gas introduced into the compressor is throttled and a gas release cooler further cooling the compressed gas fed from said precooler when the gas is released, said gas release cooler comprising a heat transfer tube connected at an inlet to an outlet of said heat transfer tube of said precooler, and the shell of said precooler enclosing said heat transfer tube of said precooler and said gas release cooler, said shell of said precooler having a cooling medium flowing therein and therethrough, and said gas release valve being located at an outlet end of said heat transfer tube of said gas release cooler.*

*12. A single-stage oilless screw compressor system comprising:*

*a drive unit;*

*transmission means connected to said drive unit for increasing a rotational speed thereof, said transmission means comprising a gear and a pinion meshing with said gear;*

*a single-stage screw compressor connected to said pinion of said transmission means and having a pressure discharge pressure to suction ratio of over four, said single-stage oilless screw compressor comprising a casing formed with a suction port and a discharge port, a pair of screw rotors rotatably located in said casing and meshing with each other, and bearing means supporting said pair of screw rotors;*

*a precooler connected to a discharge side of said single-stage oilless screw compressor, said precooler comprising a heat transfer tube and a shell enclosing said heat transfer tube;*

*a cooler connected to an outlet side of said precooler, said cooler comprising a heat transfer tube and a shell enclosing said heat transfer tube; and*

*a check valve located in a compressed gas passage between said precooler and cooler.*

*13. A single-stage oilless screw compressor system as claimed in claim 12, further comprising suction port adjusting means located on a suction side of said compressor for adjusting the volume of gas drawn by suction into the compressor, said suction port adjusting means comprising a suction port adjusting valve for throttling the volume of gas drawn by suction into the compressor, and a piston and a cylinder for actuating said suction port adjusting valve.*

*14. A single-stage screw compressor system as claimed in claim 12, further comprising a gas release valve brought to an open position when the volume of gas introduced into the compressor is throttled and a gas release cooler further cooling the compressed gas fed from said precooler when the gas is released, said gas release cooler comprising a heat transfer tube connected at an inlet to an outlet of said heat transfer tube of said precooler, and the shell of said precooler enclosing said heat transfer tube of said precooler and said gas release cooler, said shell of said precooler having a cooling medium flowing therein and therethrough, and said gas release valve being located at an outlet end of said heat transfer tube of said gas release cooler.*

*15. A single-stage oilless screw compressor system comprising:*

*a drive unit;*

*transmission means connected to said drive unit for increasing a rotational speed thereof, said transmission means comprising a gear box, a gear, and a pinion meshing with said gear;*

*a single-stage oilless screw compressor connected to said pinion of said transmission means and having a pressure discharge pressure to suction ratio of over four, said single-stage oilless screw compressor comprising a casing formed with a suction port and a discharge port, a pair of screw rotors rotatably located in said casing and meshing with each other, bearing means supporting said pair of screw rotors, seal means interposed between said casing and shafts of said pair of screw rotors;*

*a precooler connected to a discharge side of said single-stage oilless screw compressor;*

*a cooler connected to an outlet side of said precooler;*

*a check valve located in a compressed gas passage between said precooler and cooler; and*

*an oil-feeding pump coupled to a shaft of said gear through additional gears.*

*16. A single-stage oilless screw compressor system as claimed in claim 15, wherein said cooler comprises a shell having a flange, a heat transfer tube and a cover connected to said flange, wherein said check valve is located inside said cover.*

*17. A single-stage oilless screw compressor system comprising:*

*a drive unit;*

*transmission means connected to said drive unit for increasing a rotational speed thereof;*

*a single-stage oilless screw compressor connected to said transmission means and having a pressure discharge pressure to suction ratio of over four, said single-stage oilless screw compressor comprising a casing formed with a suction port and a discharge port, a pair of screw rotors rotatably located in said casing and meshing with each other, bearing means supporting said pair of screw rotors, seal means interposed between said casing and shafts of said pair of screw rotors, and synchronizing gear means mounted on said pair of screw rotors for bringing about synchronization of their rotations;*

*a precooler connected to a discharge side of said single-stage oilless screw compressor, said precooler comprising a heat transfer tube and a shell enclosing said heat transfer tube;*

*a cooler connected to an outlet side of said precooler, said cooler comprising a heat transfer tube and a shell enclosing said heat transfer tube;*

*a check valve located in a compressed gas passage between said precooler and cooler;*

*a suction port adjusting valve mounted adjacent said suction port of said casing of said compressor;*

*an air release valve for releasing the compressed air into the atmosphere;*

*an air release cooler connected to the outlet side of said precooler and said air release valve; and*

*pressure detecting means for sensing pressure above a predetermined level in the discharge side of said compressor and generating a signal to close said suction port adjusting valve and simultaneously open said air release valve.*

*18. A single-stage oilless screw compressor system as claimed in claim 17, wherein said air release cooler includes a heat transfer tube located in the shell of said precooler.*

*19. A single-stage oilless screw compressor system as claimed in claim 17, wherein said air release valve and said suction port adjusting valve include a common valve shaft whereby said air release valve is opened by a closing movement of said suction port adjusting valve.*

* * * * *